United States Patent [19]

Poitras

[11] 4,358,027
[45] Nov. 9, 1982

[54] LIQUID DISPENSER APPARATUS

[76] Inventor: Edward J. Poitras, Vero Beach, Fla. 32960

[21] Appl. No.: 226,140

[22] Filed: Jan. 19, 1981

Related U.S. Application Data

[63] Continuation of Ser. No. 64,803, Aug. 8, 1979, abandoned.

[51] Int. Cl.³ .............................................. G01F 11/02
[52] U.S. Cl. ..................................... 222/43; 222/309; 222/341; 222/375
[58] Field of Search .................. 222/43, 49, 309, 340, 222/341, 375; 73/425.6, 864.18

[56] References Cited

U.S. PATENT DOCUMENTS

| | | | |
|---|---|---|---|
| 1,486,656 | 3/1924 | Green | 222/309 |
| 2,548,752 | 4/1951 | Titus | 222/309 |
| 2,985,339 | 5/1961 | Fischer et al. | 222/309 X |

FOREIGN PATENT DOCUMENTS 149461  9/1931  Switzerland ...................... 73/425.6

*Primary Examiner*—Joseph J. Rolla
*Assistant Examiner*—Frederick R. Handren

[57] ABSTRACT

A liquid dispenser apparatus including a liquid container, a pump for withdrawing metered quantities of liquid from the container and comprising a cylinder that defines inlet and outlet ports and a piston manually reciprocable between an intake stroke during which liquid is drawn through the inlet port and a discharge stroke during which liquid is expelled through the outlet port, a manual selector for adjustably fixing the maximum length of the discharge stroke, and a manual valve for selectively opening and closing the inlet and outlet ports. A pump rod is fixed to the piston and extends out of the cylinder so as to be manually operable to produce the intake and discharge strokes and the selector includes an adjustable limit mechanism that limits the length of the intake stroke and thereby the discharge stroke.

6 Claims, 5 Drawing Figures

LIQUID DISPENSER APPARATUS

CROSS-REFERENCE TO RELATED APPLICATION

This application is a continuation of U.S. application Ser. No. 064,803, entitled "Liquid Dispenser Apparatus", filed Aug. 8, 1979, which application is now abandoned.

BACKGROUND OF THE INVENTION

This invention relates generally to apparatus for dispensing metered quantities of liquids and, more particularly, to a machine for selectively dispensing specific volumes of colorants used to formulate paints of various color.

In the interest of limiting costly inventories, most retail stores formulate many paint colors at the time of purchase rather than stocking all available colors. The formulation is accomplished by adding specified quantities of colorant tints to a white base paint so as to create the specific color desired. Typically, paints are formulated with apparatus including a plurality of colorant filled containers and pumping mechanisms for withdrawing predetermined quantities therefrom. In the simplest machines of this type, a can filled with the base paint is sequentially moved to each desired colorant container and its individual pump is actuated to withdraw the desired quantity of fluid colorant. A more efficient machine of this type includes a rotary turntable on which the colorant containers are mounted and which is used to sequentially move each colorant container required for the formulation to a given discharge area occupied by the base paint filled can. Although such machines are relatively simple and inexpensive and function satisfactorily for many applications, they exhibit the disadvantage of requiring a substantial amount of attention by an operator thereby adding significant labor cost to the paint sold.

For example, most such machines require a distinct volume setting prior to each pump discharge cycle resulting in a multiplication of individual effort for those numerous instances in which a customer is purchasing several cans of a particular color. Conversely, there exist rather intricate automatic paint colorant machines that will dispense the various tints required for a given formulation in response to a simple set of instructions presented, for example, by the mere insertion of a coded punch card selected by an operator. Although drastically reducing required operator time these machines are too expensive for practical use in most retail outlets and also suffer breakdowns that require complex repairs and often render them dysfunctional for extended periods of time.

The object of this invention, therefore, is to provide a simple paint colorant dispensing machine that limits required operator attention and is in addition reliable and relatively inexpensive.

SUMMARY OF THE INVENTION

The invention is a liquid dispenser apparatus including a liquid container, a pump for withdrawing metered quantities of liquid from the container and comprising a cylinder that defines inlet and outlet ports and a piston manually reciprocable between an intake stroke during which liquid is drawn through the inlet port and a discharge stroke during which liquid is expelled through the outlet port, a manual selector for adjustably fixing the maximum length of the discharge stroke, and a manual valve for selectively opening and closing the inlet and outlet ports. The invention provides in an extremely simple and low cost structure, a dispenser that can be selectively adjusted to repeatedly deliver a metered quantity of liquid from a supply reservoir.

In a preferred embodiment of the invention the pump includes a pump rod fixed to the piston and extending out of the cylinder and the selector includes an adjustable limit mechanism that limits the length of the intake stroke and thereby the discharge stroke. Appropriate manipulation of the pump rod produces the desired intake and discharge strokes of the piston while the adjustable limit mechanism selectively establishes the particular liquid quantity that is expelled during each discharge stroke.

According to one feature of the invention, the limit mechanism includes a stop slidably mounted on the pump rod within the cylinder, an abutment surface thereon for engaging the stop to limit the intake stroke, and a releaseable latch for fixing the stop to the pump rod. The latch preferably comprises a fastener supported by the stop and moveable by an actuator from a locked position that prevents relative movement between the stop and the pump rod to a release position that permits such movement. With the fastener in its release position, the position of the stop on the pump rod can be adjusted to establish the length of the intake stroke and thereby the volume of liquid that is expelled during a discharge stroke.

According to another feature of the invention, the fastener actuator includes an activator portion fixed to the outside of the cylinder and a release portion extending thereinto. With the stop and abutment surface engaged operation of the activator portion causes the release portion to engage and move the fastener into its release position thereby permitting adjustment of the stop on the pump rod.

Other features of the invention include an elongated graduated scale on the pump rod and a multi-position valve having an intake position that closes the outlet port and provides fluid communication between the container and the cylinder and a discharge position that closes the inlet port and opens the outlet port. The multi-position valve is a simple mechanism for controlling liquid flow to and from the pump and the graduated scale provides a convenient visual indication of the selected intake stroke and corresponding liquid volume to be expelled during a discharge stroke.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENT

Figure 1:
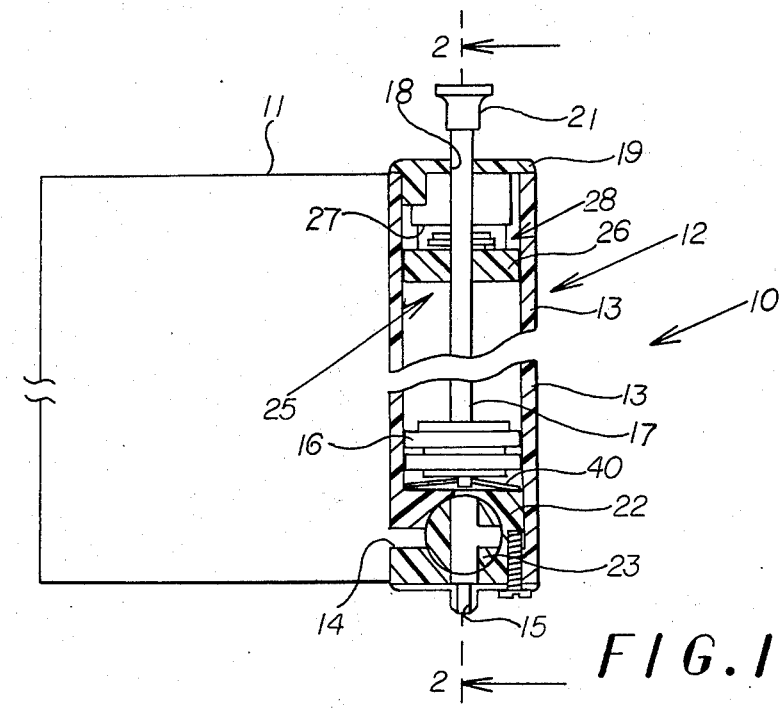
FIG. 1 is an elevational view of the invention partially in cross section.
Figure 2:
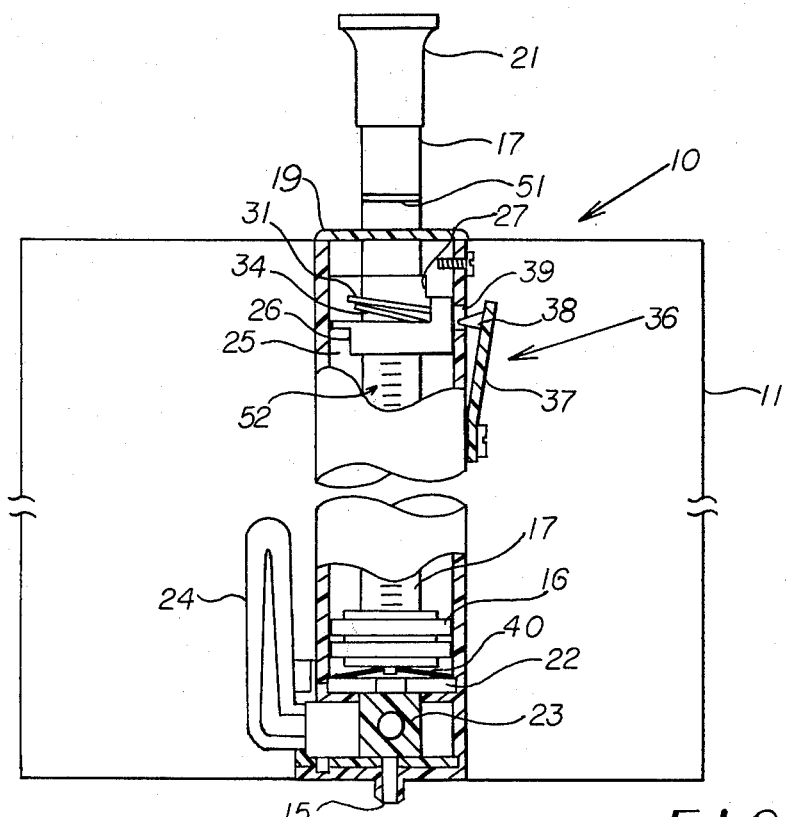
FIG. 2 is a partial cross-sectional view of the dispenser shown in FIG. 1 taken along the lines 2—2.

Referring now to FIGS. 1 and 2 there is shown a dispenser 10 including a container 11 for a liquid to be dispensed and a pump assembly 12 for expelling metered quantities of liquid therefrom. Although only a single dispenser 10 is shown, it will be appreciated that a plurality of either stationary or turntable mounted dispensers could be used to accommodate a variety of colorant tints. The pump assembly 12 comprises a pump cylinder 13 that defines an inlet port 14 and an outlet port 15, a piston 16 reciprocable within the cylinder 13 and an elongated pump rod 17 having one end fixed to the piston 16 and extending through an opening 18 in a cap 19 closing one end of the cylinder 13. Secured to the outer end of the pump rod 17 is a knob 21. The lower end of the cylinder 13 is closed by a valve housing 22 that retains a multi-position rotary valve body 23 operatively fixed to a valve handle 24. In an intake position the valve body 23 establishes a liquid communication path between the container 11 and the cylinder 13 and in a discharge position closes the inlet port 14 and opens the outlet port 15.

Figure 3:
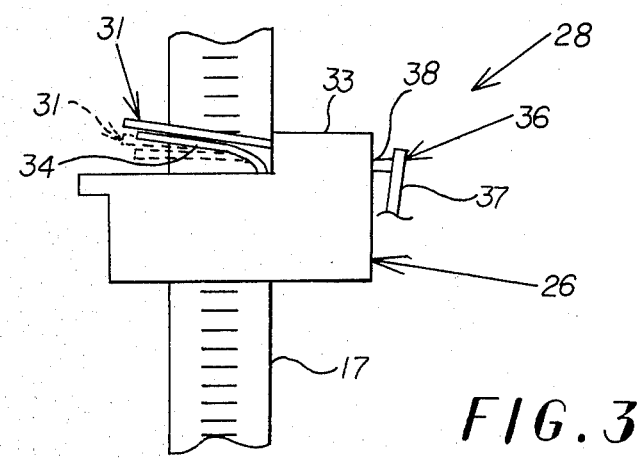
FIGS. 3-5 are detailed views of a latch mechanism shown in FIGS. 1 and 2.
Figure 4:
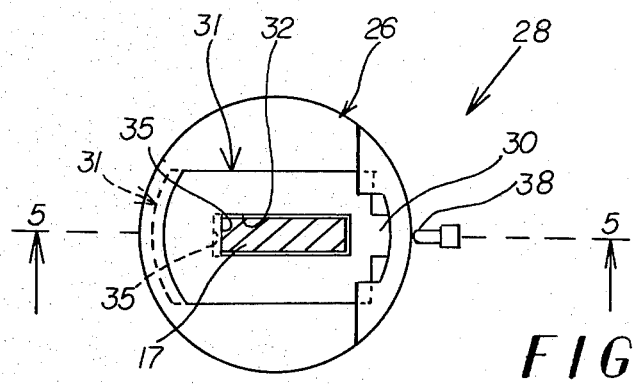
Figure 5:
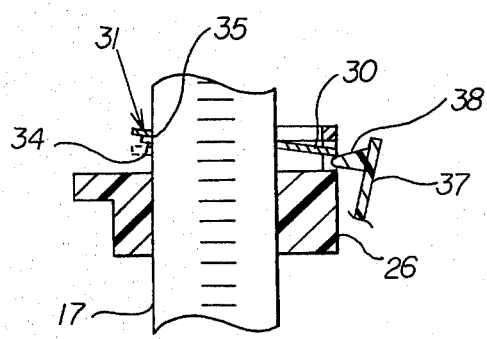

The maximum length of an intake stroke and, accordingly, a discharge stroke by the piston 16 can be adjustably fixed by a selector assembly 25. Forming the selector assembly 25 is a limit mechanism comprising a stop 26 slidably mounted on the pump rod 17, an abutment surface 27 defined by the cap 19 and engageable by the stop 26, and a latch mechanism 28 for releaseably fixing the stop 26 to the pump rod 17. As more clearly shown in FIGS. 3–5, the latch mechanism 28 includes a fastener 31 with an aperture 32 accommodating the pump rod 17. One end 30 of the fastener is retained by a hood 33 on the stop 26 while the opposite end is biased in an upwardly inclined locked position by a spring member 34 fixed to the stop 26. In its locked position, one edge 35 of the aperture 32 forcibly engages the pump rod 17 so as to prevent movement thereof relative to the stop 26. Also included in the latch mechanism is an actuator 36 including a resilient activator portion 37 having one end fixed to the outer surface of the cylinder 13 and a release portion 38 extending from a free end of the activator portion into an opening 39 in the cylinder 13. With the stop 26 engaging the abutment surface 27, manual pressure on the activator portion 37 forces the release portion 38 into camming engagement with the end 30 of the fastener 31. This produces downward movement of its opposite end 42 into a release position as indicated by dotted lines. In that position, engagement is eliminated between the edge 35 and the pump rod 17 so as to allow relative movement therebetween While engaging the fastener end 30 the release portion 38 also fixes the stop 26 relative to the cylinder 13 during movement of the pump rod 17.

Prior to use of the dispenser apparatus 10, the selector assembly 25 is adjusted to establish a given desired liquid volume output for the pump assembly 12. Adjustment is accomplished by drawing the pump rod 17 out of the cylinder 13 until the stop 26 engages the abutment surface 27. With the stop 26 in that position, inward movement of the activator portion 37 moves the fastener 31 into its release position as described above. The pump rod 17 can then be moved independently of the stop 26 into a position wherein the piston 16 will establish a desired intake volume within the cylinder 16. The exact size of this volume is indicated by a marker 51 fixed to the cap 19 and aligned with a graduated scale 52 secured to the elongated rod 17. After the desired position of the piston 16 is attained, inward pressure on the resilient activator portion 37 is removed allowing the release portion 38 to move out of engagement with the fastener 31. This in turn allows the spring 34 to return the fastener to its locked position. Subsequent movement of the rod 17 and attached piston 16 is accompanied by movement of the stop 26 that is fixed to the rod by the fastener 31.

After selective adjustment of the selector assembly 25, the pump knob 21 can be manually manipulated to produce alternate upward intake strokes of the piston 16 and downward discharge strokes thereof. During an intake stroke of the piston 16, the valve body 23 is moved into its intake position that establishes a liquid communication path between the container 11 and the cylinder 13. Consequently, a quantity of liquid determined by the length of the piston stroke is drawn from the container 11 into the cylinder 13. After the cylinder 13 has been filled with the desired quantity of liquid, the valve handle 24 is operated to move the rotary valve 23 into a discharge position that closes the inlet port 14 and opens the outlet port 15. A subsequent discharge stroke of the piston 16 produced by forcing the pump rod 17 down to the bottom of the cylinder 13 results in expulsion of the metered quantity of liquid drawn into the pump during the previous intake stroke of the piston 16. During each subsequent intake stroke of the piston 16, the stop 26 will again limit movement of the piston 16 to the previously established position. Thus, each succeeding discharge stroke will expel the predetermined volume of liquid. When a different specific volume of liquid is desired, the selector mechanism 25 is readjusted as described above to establish between the stop 26 and the rod 17 relative positions that result in an intake stroke of desired length. All subsequent discharge strokes will then expel the newly set metered quantity.

Referring again to FIGS. 1 and 2 there is shown a concave spring member 40 attached to the bottom surface of the piston 16. During each discharge stroke, the application of force via the rod 17 flattens the spring member 40 against the bottom of the cylinder 13. Consequently, all liquid in the cylinder 13 is expelled through the outlet port 15. After a user has released the knob 21, the resilient spring member 40 returns to its concave shape producing a small retraction of the piston 16. Each such retraction withdraws any liquid remaining at the outlet port 15 and thereby prevents undesirable dripping therefrom.

Obviously, many modifications and variations of this present invention are possible in light of the above teachings. For example only the desired adjustably fixed maximum discharge stroke could be provided also by limiting the maximum stroke of the rod 17 into the cylinder 13. In that case, an adjustable stop similar to the stop 26 would be provided on the piston rod 17 outside of the cylinder 13 and the scale on the rod 17 would be reversed. After appropriate adjustment of such a stop, each intake stroke of the piston 16 will fully fill the cylinder 13 but the limited inward movement of the rod 17 will result in the desired maximum discharge stroke. It is to be understood, therefore, that the invention can be practiced otherwise than as specifically described.

What is claimed is:
1. Liquid dispenser apparatus comprising:
container means for a liquid to be dispensed;
pump means for withdrawing metered quantities of liquid from said container means, said pump means comprising a cylinder defining inlet and outlet ports and a piston being manually reciprocable between an intake stroke during which liquid is drawn through said inlet port and a discharge stroke during which substantially the entire liquid content of said cylinder is expelled through said outlet port, said pump means further comprising a pump rod fixed to said piston and extending out of said cylinder so as to be manually accessible and operable to produce said intake and discharge strokes;

manual selector limit means for adjustably fixing the maximum length of said discharge stroke; said limit means comprising a stop slidably mounted on said pump rod and located within said cylinder so as to adjustably limit said discharge stroke and thereby establish the volume of liquid drawn into said cylinder during said intake stroke and discharged during said fixed discharge stroke, fastener means supported by said stop and movable between a locked position that prevents relative movement between said stop and said pump rod and a release position that allows said movement, an activator operable to move said fastener between said locked and release positions, a bias means biasing said fastener means toward said locked position, and an abutment surface on said cylinder for engaging said stop to limit said discharge stroke and wherein said activator means is manually operable to overcome said bias and force said fastener means into said release position; and manual valve means for selectively opening and closing said inlet and outlet ports.

2. A liquid dispenser apparatus according to claim 1 including a scale means for indicating said fixed maximum length of said discharge stroke.

3. A liquid dispenser apparatus according to claim 1 wherein said activator means comprises an activator portion fixed to said cylinder and located outside thereof and a release portion extending into said cylinder, said activator portion being manually operable with said stop and abutment surface engaged to move said release portion into engagement with said fastener means and thereby move said fastener means into said release position.

4. A liquid dispenser apparatus according to claim 1 wherein said valve means comprises a multi-position valve having intake and discharge positions, said valve closing said outlet port and providing a liquid communication path between said container means and said cylinder when in said intake position and closing said inlet port and opening said outlet port when in said discharge position.

5. A liquid dispenser apparatus according to claim 4 wherein said scale means comprises an elongated graduated scale on said pump rod.

6. A liquid dispenser apparatus according to claim 1 including a resilient member positioned between said piston and the bottom of said cylinder so as to be compressed at the end of each said discharge stroke, said resilient member adapted to expand at the completion of each said discharge stroke and produce a predetermined retraction of said piston.

* * * * *